United States Patent

[11] 3,626,376

[72] Inventors Lawrence B. Anderson
Boulder, Colo.;
Robert S. Capowski, Wappingers Falls;
Gregg C. Hiatt, Poughkeepsie; Joseph H. Miller, Poughkeepsie, N.Y.

[21] Appl. No. 37,070
[22] Filed May 14, 1970
[45] Patented Dec. 7, 1971
[73] Assignee International Business Machines Corporation
Armonk, N.Y.

[54] SKEWING CIRCUIT FOR MEMORY
4 Claims, 1 Drawing Fig.

[52] U.S. Cl. .......... 340/172.5
[51] Int. Cl. .......... G06f 13/00
[50] Field of Search .......... 340/172.5; 235/157

[56] References Cited

UNITED STATES PATENTS 3,319,228 5/1967 Apple .......... 340/172.5
3,346,850 10/1967 Wehrig .......... 340/172.5
3,380,030 4/1968 McMahon .......... 340/172.5

*Primary Examiner*—Raulfe B. Zache
*Assistant Examiner*—Mark Edward Nusbaum
*Attorneys*—Hanifin and Jancin and William S. Robertson

ABSTRACT: A circuit is provided for transferring a multibyte word of data from a buffer memory to a main memory beginning at any available byte position in the main memory. A gating circuit is controlled in response to an address designating the starting byte position for skewing bytes from the buffer to the starting byte position and to any remaining byte positions of the first addressed word location of the memory. A set of registers and a gating circuit are provided for storing any remaining data bytes from the word read from the buffer. On subsequent transfers, data is transferred simultaneously from the buffer and the register to form a complete word for storage in the main memory and remaining bytes from the buffer are then entered into the register for a subsequent transfer.

PATENTED DEC 7 1971 3,626,376
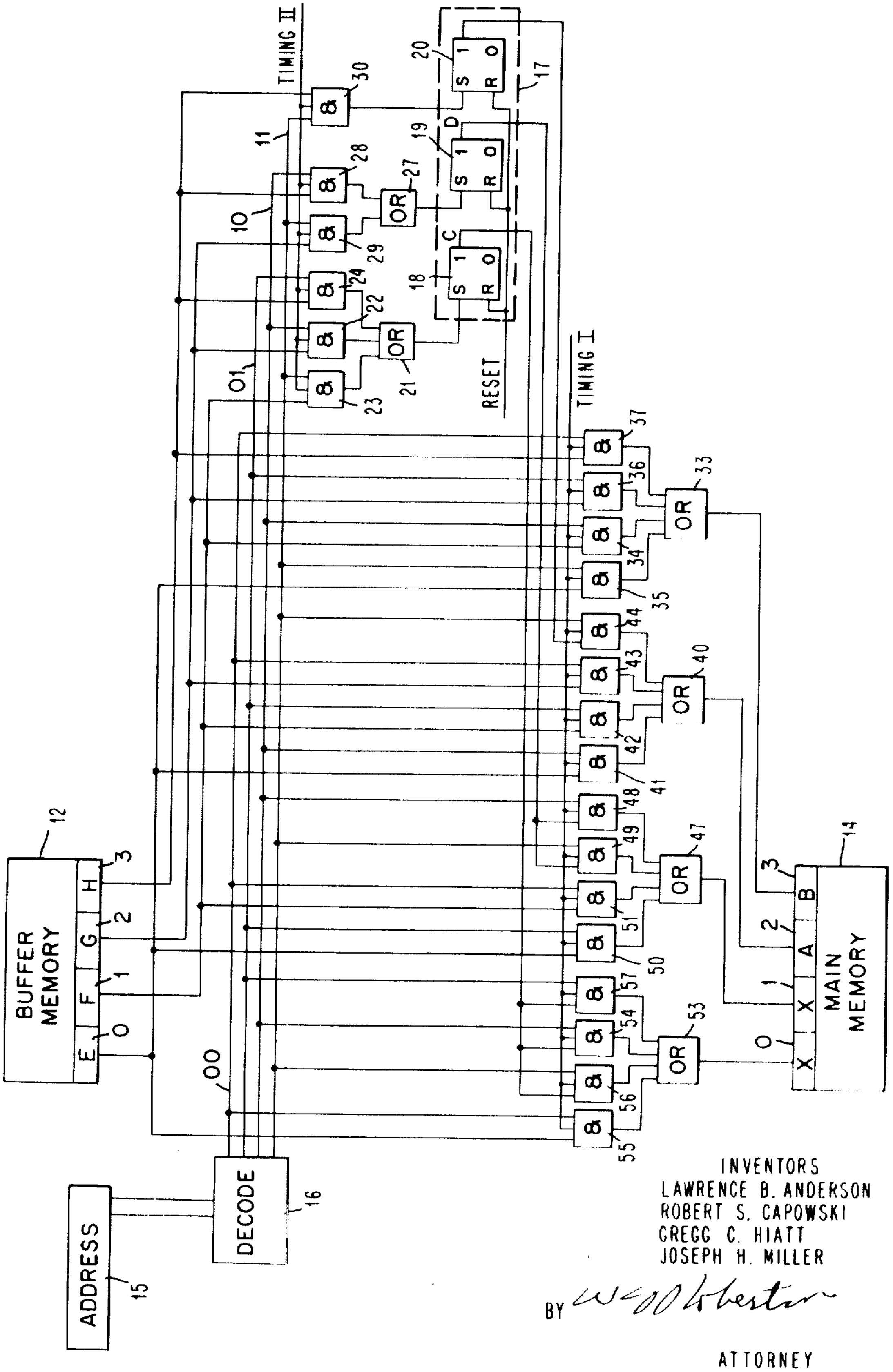
INVENTORS
LAWRENCE B. ANDERSON
ROBERT S. CAPOWSKI
GREGG C. HIATT
JOSEPH H. MILLER
BY [signature]
ATTORNEY

SKEWING CIRCUIT FOR MEMORY

INTRODUCTION

A memory data transfer called "chaining" illustrates some of the objects of the circuit of this invention and the problems in achieving these objects. When a block of data is to be transferred from an I/O device to a main memory, a block of addresses are assigned to the I/O channel that handles the transfer. If no single block of available addresses is large enough to receive the entire transfer, a succession or chain of block addresses is supplied to the channel. In some situations, the next address is unknown when the channel begins to store data from the I/O device in the buffer memory of the channel. This address tells not only the starting word address in the main memory, but it also identifies the starting byte position within the word. For example, if it is known that the transfer is to begin at byte position 2 of the addressed word location, the buffer loading can begin at its byte position 2. The first operation transfers a partial word from the buffer to the memory and subsequent operations transfer a word from the buffer to a word location in the memory. Such an operation is particularly difficult with an I/O device such as a magnetic tape unit which can not be readily stopped for the interval in which the next address is formed. One object of this invention is to provide means by which a buffer can be loaded at its starting address and its contents can later be transferred to any starting byte position of the main memory.

THE INVENTION

This invention provides a skewing circuit for transferring the first bytes of data from a buffer memory to the starting byte position and any remaining byte locations in the first word location of the main memory. Any remaining bytes of the first word of the buffer are transferred into a register in a position for subsequent transfer to designated byte locations of the main memory. A decoder for low-order bit positions of the register holding the starting address controls the skewing circuit. Other bytes of the first word of the buffer are stored in a register. On subsequent transfers, the circuit is controlled to transfer to the memory bytes from the next word of the buffer and the bytes in the register from the preceding word of the buffer. The register is then reset and remaining bytes from the buffer are stored in the register. The circuit is easily adaptable to reading words from the buffer in their reverse order.

THE DRAWING

The single FIGURE in the drawing shows the circuit of this invention and associated components of a data processing system.

DETAILED DESCRIPTION

Conventional Features

The drawing shows a main memory 14 and a buffer memory 12 which are interconnected by the circuit of this invention. The buffer memory is part of a data channel and receives data from an I/O device (not shown) to be transferred to main memory 14. An address register 15 which forms part of the channel provides the main memory address to which the data is to be transferred. Means not shown are provided for incrementing or decrementing the address in register 15 for a block transfer. The channel includes suitable timing means (not shown) from which timing signals are derived for use in the skewing circuit of this invention.

In the drawing, memory 14 includes a representation of a word location of four bytes where the block storage operation is to begin. The next word location in the block transfer is similarly represented in buffer 12. Byte locations in buffer 12 and in memory 14 are designated 0, 1, 2 and 3. In an example that will be used to simplify the explanation of the drawing, the two low-order bits of address register 15 are 1 0 and the transfer is to begin in byte position 2 of memory 14. Byte positions 0 and 1 of the illustrated word in memory 14 are labeled X to signify that these positions are not involved in the block transfer and that the bytes stored in these positions are to be preserved. The four bytes of the first word of the transfer are designated A, B, C and D. Bytes A and B are entered into byte positions 2 and 3, and bytes C and D are held outside the memory and are to be entered into byte positions 0 and 1 of the next addressed word location. The four bytes of the second word of the transfer are designated E, F, G and H and are shown in a word location of buffer 12.

The single output line for each byte position of buffer 12 and input line for each byte position of memory 14 are representative of a conventional set of wires for the number of bit positions of a byte. Typically, a memory holds eight data bits and one check bit for each byte and a line is provided for each bit position for parallel transfer. The circuit that will be discussed next shows the components for transferring one bit from each byte position. Similar circuits are of course provided for each bit position.

The Address Decode Circuit

The two low-order bit positions of register 15 designate one of the four byte positions as the starting position for the transfer. A decode circuit 16 is provided to receive the two low-order bits of address register 15 and to energize one of four output lines according to an AND logic function of contents of these bit positions. For example, the upper most line from decode circuit 16, which is labeled 0 0, is energized when the two low-order bits of register 15 are 0 0.

The Skew Register

A register 17 is provided to hold any bytes of data that cannot be transferred directly from buffer 12 to main memory 14. Register 17 has three latches 18, 19 and 20; (i.e., one fewer than the number of byte positions in buffer 12). A common line connects the three latches to receive a RESET signal. Each latch is representative of a set of latches for each bit position of the associated byte of buffer 12. The output of each latch is connected to gating circuits (described later) for a particular byte position of memory 14. As will be described next, a set of gating circuits connects the latches to receive data from appropriate byte positions of buffer 12 according to the output of decode circuit 16.

Latch 18 receives data from byte positions 1, 2, or 3 of buffer 12 and supplies an input to byte position 0 of memory 14. It has its 1 output connected to supply a 1 or 0 to gating circuits (described later) for the 0 byte position of memory 14. For the example that the drawing illustrates in which the output of decode circuit 16 is 1 0, latch 18 has its set input connected through an OR-circuit 21 and an AND-circuit 22 to byte position 2 of buffer 12. In this example, latch 18 holds a bit of byte C, as the legend at the 1 output of latch 18 shows. Similarly, OR-circuit 21 and an AND-circuit 23 connect the set input of latch 18 to byte position 1 of buffer 12 when the decode output is 1 1, and OR-circuit 21 and an AND-circuit 24 connect the set input of latch 18 to byte position 3 of buffer 12 when the decode output is 0 1.

For the example of the drawing in which the decode output is 1 O, an OR-circuit 27 and an AND-circuit 28 connect the set input of latch 19 to byte position 3 of buffer 12 and a bit of byte D appears at the 1 output of latch 19. Similarly, AND-circuit 29 connects OR-circuit 27 to byte position 2 of buffer 12 when the address is 1 1. Latch 20 receives an input only when the address is 1 1, and an AND-circuit 30 connects the set input of latch 20 to byte position 3 of buffer 12. A timing line designated TIMING II is connected to each AND-circuit 22, 23, 24, 28, 29 and 30 to control entry of data into register 17.

Main Memory Gating Circuit

Byte position 3 of main memory 14 receives inputs directly from buffer memory 12 for any output of the decode circuit 16. For the example of the drawing in which the decode output is 1 0, OR-circuit 33 and an AND-circuit 34 connect memory byte position 3 to buffer byte position 1. When the decode output is 1 1, an AND-circuit 35 connects OR-circuit 33 to buffer byte position 0. When the decode output is 0 1, an AND-circuit 36 connects OR-circuit 33 to buffer byte position 2, and when the decode output is 0 0, and AND-circuit 37 connects OR1circuit 33 to buffer byte position 3.

Memory byte position 2 receives an input either from buffer 12 or register 17. For the example in which the decode circuit output is 1 0, an OR-circuit 40 and an AND-circuit 41 connect memory byte position 2 to buffer position 0. An AND-circuit 42 connects byte position 1 of the buffer to OR-circuit 40 when the decode output is 0 1, and an AND-circuit 43 connects byte position 2 of buffer 12 to OR-circuit 40 when the decode output is 0 0. An AND-circuit 44 connects the 1 output of latch 20 to OR-circuit 40 when the decode output is 1 1.

Memory byte position 1 receives an input from either byte position 0 or 1 of buffer memory 12 or from latch 19. For the example of the drawing, an OR-circuit 47 and an AND-circuit 48 connect memory byte position 1 to the output of latch 19. An AND-circuit 49 connects OR-circuit 47 to the output of latch 19 when the decode circuit output is 1 1. When the decode output is 0 1, and AND-circuit 50 connects OR-circuit 47 to byte position 0 of buffer 12; and when the decode output is 0 0, and AND-circuit 51 connects OR-circuit 47 to byte position 1 of buffer 12.

Memory byte position 0 receives an input either from byte position 0 of buffer 12 or from latch 18 of register 17. In the example in which the decode output is 1 0, an OR-circuit 53 and an AND-circuit 54 connect byte position 0 to latch 18. An AND-circuit 55 connects OR-circuit 53 to byte position 0 of buffer 12 when the decode output is 0 0. AND-circuits 56 and 57 provide a data path from latch 18 to OR-circuit 53 when the decode output is either 0 1 or 1 1.

Each AND-circuit is also controlled by a line designated TIMING I for controlling the entry of data into memory 14 from buffer 12 and register 17.

Operation

In the operation of the apparatus of the drawing, the buffer memory 12, main memory 14, and address register 15 are operated in a way that is conventional for a direct transfer between buffer 12 and memory 14. In the first step of the transfer of the two words illustrated in the drawing, the buffer memory 12 is controlled to undergo a read operation that produces bytes A, B, C and D on the lines from buffer 12. The TIMING I line is energized to transfer data from buffer 12 directly to main memory 14 and to transfer data from latches 17 and 18 to memory 14. Thus, AND-circuits 41 and 34 are conditioned to transfer data A and B from byte positions 0 and 1 of buffer 12 to byte positions 2 and 3 of memory 14. AND-circuits 48 and 54 are also conditions to transfer data from latches 18 and 19 in skew register 17 to byte positions 0 and 1 of memory 14. Since the bytes designated X in positions 0 and 1 of this word of memory 14 are to be preserved, the memory 14 is controlled (as is conventional) to produce a write operation only in byte positions 2 and 3 and to not write into byte positions 0 and 1. The TIMING I line is then deenergized and the RESET line of register 17 is energized to reset latches 18, 19 and 20. The TIMING II line is then energized to condition AND-circuits 22 and 28 to transfer bytes C and D from buffer byte positions 2 and 3 to latches 18 and 19. The TIMING II line is then deenergized and buffer 12 is operated to produce the next read operation which produces bytes E, F, G and H at its output. Thus, the operation as it has been described so far produces the data state that legend in the drawing illustrate.

Each additional transfer is identical to the transfer described except that memory 12 is controlled to produce a store operation in each byte position. During the first part of the next operation, the TIMING I line is energized to transfer bytes E and F directly from byte positions 0 and 1 of buffer memory to byte positions 2 and 3 of the main memory and simultaneously to transfer bytes C and D from latches 18 and 19 to memory byte positions 0 and 1. The TIMING I line is deenergized, register 17 is reset, and the TIMING II line is energized to condition gates 24 and 28 to transfer bytes G and H from positions 2 and 3 in the buffer memory to latches 18 and 19.

For read backwards, decode circuit 16 produces outputs that are 1 higher than the input. (Input 1 1 produces output 0 0). For example, for decode input 0 1 and output 1 0, bytes E, F, G and H are read first and stored, as already described, with the last byte, H, in the starting position, 0 1.

Additional registers may be provided for transfers between a buffer and memory of different word size. For example, if the memory stores a word of eight bytes, the two word operation just described would store bytes A, B, C, D, E and F in the eight-byte register and would store bytes G and H in register 17. The operation could similarly be started in the second half of the eight-byte register.

From the preferred embodiment of the invention and specific variations suggested, those skilled in the art will recognize various applications and modifications of the circuit within the spirit of the invention and the scope of the claims.

What is claimed is:

1. A circuit for transferring a sequence of multibyte words from a first memory to a second memory having multibyte word locations by predetermined bits of an address in said second memory defined an address register, comprising:

- a signal line for each byte position in said second memory, and address decoder means responsive to said predetermined bits in said address register for producing a signal on the one of said lines identifying said starting byte position;
- a multibyte register having one fewer byte positions than a word of said first memory;
- means responsive to said signal for transferring bytes from a word read from said first memory to said starting byte position in said second memory and any available subsequent byte positions in a word location;
- means responsive to said signal for transferring to said register any remaining bytes of a word of said first memory; and
- means responsive to said signal for transferring any bytes in said register to the following byte positions in said second memory.

2. The circuit of claim 1 including timing means for initiating the transfer of any bytes from said register and bytes from said first memory to said multibyte location and thereafter transferring said any remaining bytes to said register.

3. The circuit of claim 2 in which said means for transferring bytes to said register comprises gating means responsive to a said signal on said signal lines and to said timing means for transferring selected byte positions of said buffer to said register.

4. The circuit of claim 3 in which said second memory and said first memory have equal numbers of bytes in a stored word.

* * * * *